United States Patent
Soucy et al.

(10) Patent No.: US 8,225,907 B2
(45) Date of Patent: Jul. 24, 2012

(54) SYSTEM AND METHOD FOR LUBRICATING A CHAIN SAW WITH GREASE

(75) Inventors: Robert Soucy, Laterrière (CA); Ghyslain Boulianne, St-Prime (CA)

(73) Assignee: S.T.L. Lubrifiants Inc., Quebec (CA)

( * ) Notice: Subject to any disclaimer, the term of this patent is extended or adjusted under 35 U.S.C. 154(b) by 223 days.

(21) Appl. No.: 12/600,309

(22) PCT Filed: May 17, 2007

(86) PCT No.: PCT/CA2007/000884
§ 371 (c)(1),
(2), (4) Date: Nov. 16, 2009

(87) PCT Pub. No.: WO2008/141411
PCT Pub. Date: Nov. 27, 2008

(65) Prior Publication Data
US 2010/0147628 A1    Jun. 17, 2010

(51) Int. Cl.
| F16N 7/16 | (2006.01) |
| F16N 7/24 | (2006.01) |
| F16N 13/22 | (2006.01) |
| F16N 13/00 | (2006.01) |
| B23D 59/04 | (2006.01) |
| B23Q 11/12 | (2006.01) |
| B65G 45/02 | (2006.01) |
| B65G 45/08 | (2006.01) |

(52) U.S. Cl. ........ 184/15.1; 184/15.2; 184/26; 30/123.4; 30/515; 30/123.3; 198/500

(58) Field of Classification Search .......... 184/15.1, 184/15.2, 26, 37; 30/123.4, 381, 515, 123, 30/123.3; 83/169, 830; 198/500
See application file for complete search history.

(56) References Cited

U.S. PATENT DOCUMENTS

| 3,266,534 | A | * | 8/1966 | Carnesecca, Jr. et al. | ...... 30/383 |
| 3,568,569 | A | | 3/1971 | Haley | |
| 3,581,783 | A | * | 6/1971 | Sandin | ........ 30/123.4 |
| 3,717,221 | A | * | 2/1973 | Densow | ........ 184/6.4 |
| 3,777,401 | A | * | 12/1973 | Arff et al. | ........ 30/383 |
| 3,870,125 | A | * | 3/1975 | Gorski | ........ 184/15.1 |
| 4,534,005 | A | | 8/1985 | Nagashima et al. | |
| 4,635,513 | A | | 1/1987 | McGeehee | |
| 4,819,332 | A | | 4/1989 | Sugihara et al. | |
| 4,884,340 | A | * | 12/1989 | Newman | ........ 30/122 |
| 4,896,648 | A | * | 1/1990 | Boller | ........ 125/21 |
| 4,947,550 | A | * | 8/1990 | Wenzel | ........ 30/123.4 |
| 5,634,273 | A | * | 6/1997 | Michels et al. | ........ 30/123.4 |
| 5,653,028 | A | * | 8/1997 | Hashimoto | ........ 30/123.4 |
| 5,669,140 | A | * | 9/1997 | Tsumura | ........ 30/123.4 |
| 2004/0003969 | A1 | * | 1/2004 | O'Toole et al. | ........ 184/26 |
| 2007/0090132 | A1 | * | 4/2007 | Williams et al. | ........ 222/389 |

FOREIGN PATENT DOCUMENTS
DE    3542476 A1    6/1987

* cited by examiner

Primary Examiner — Michael Mansen
Assistant Examiner — Minh Truong
(74) Attorney, Agent, or Firm — Norris McLauglin & Marcus P.A.

(57) ABSTRACT

The system includes a grease pump assembly connected to a conduit having a grease outlet adjacent an endless chain of the chainsaw. The method includes pushing the grease toward the grease pump, pumping the grease, and feeding the grease between the endless chain and the guide bar. The pumping of the grease can be done automatically upon detecting an activation of the chain saw.

16 Claims, 5 Drawing Sheets

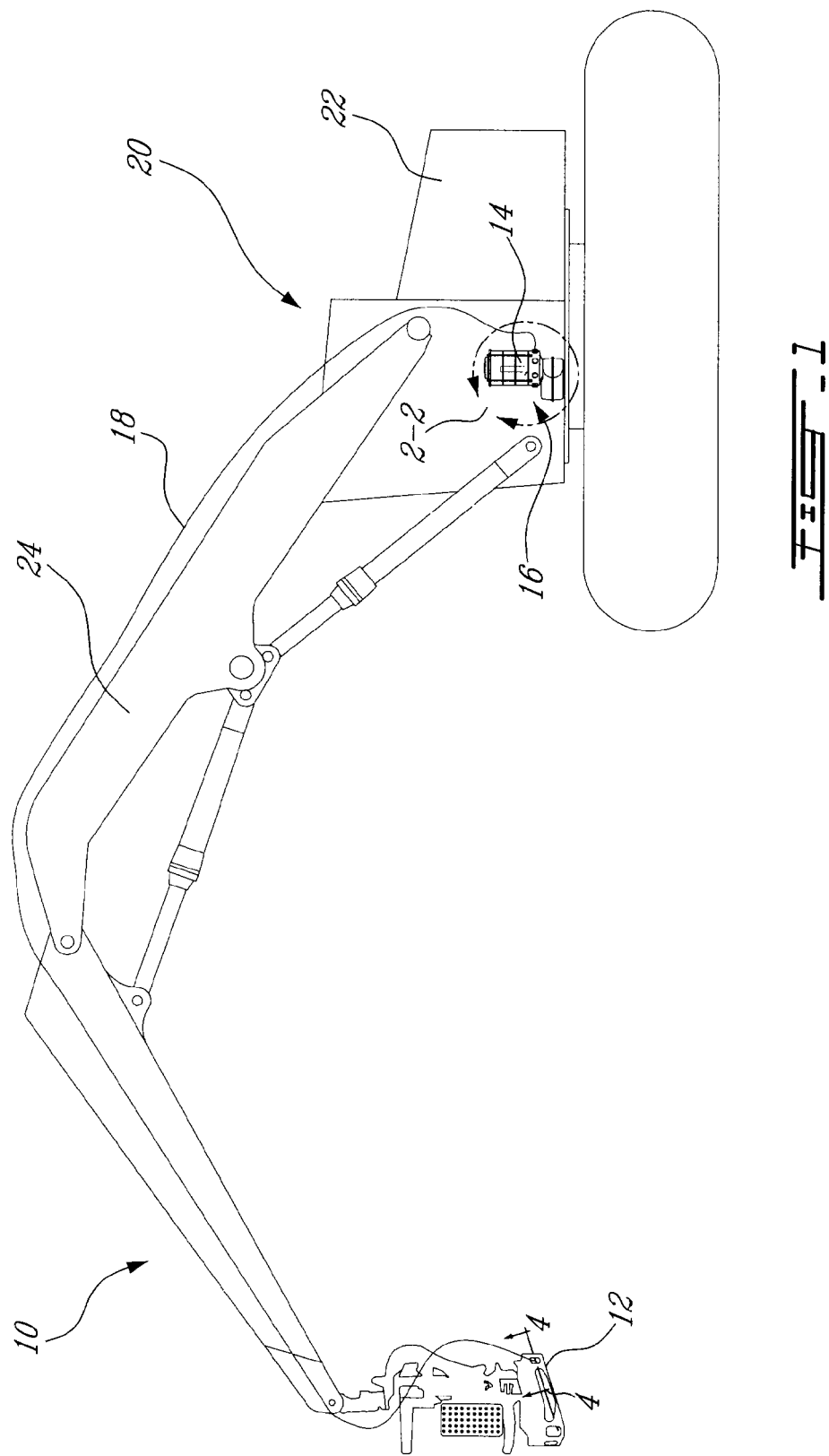

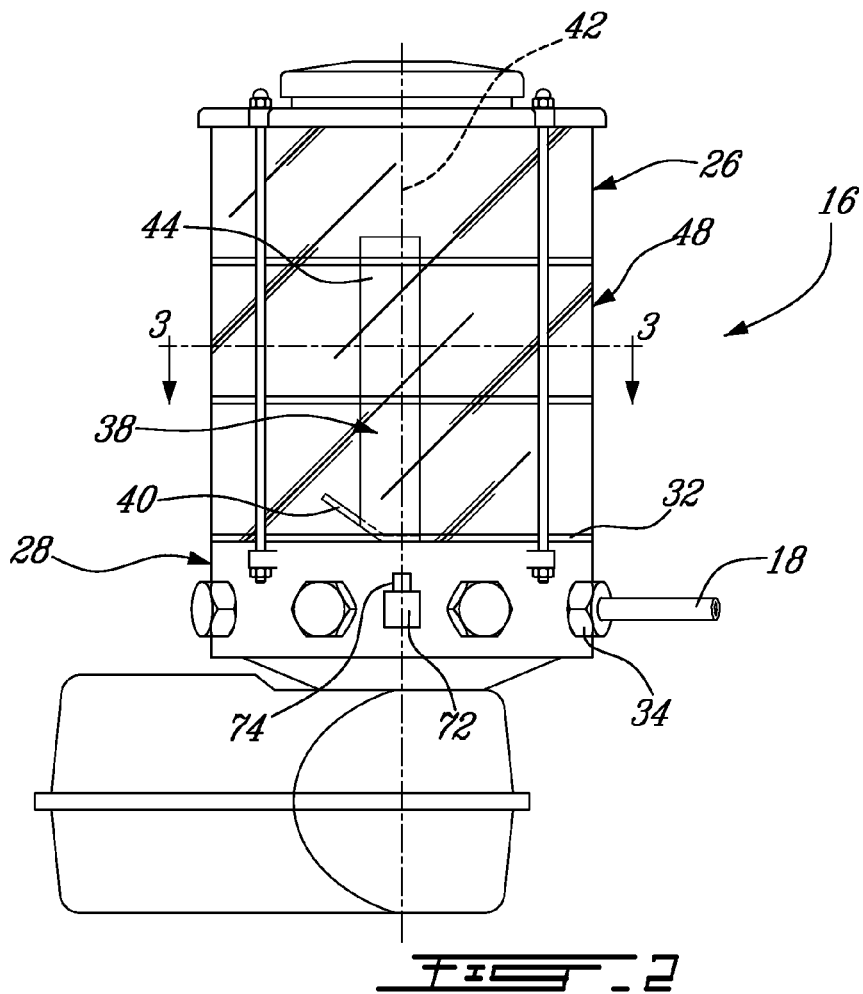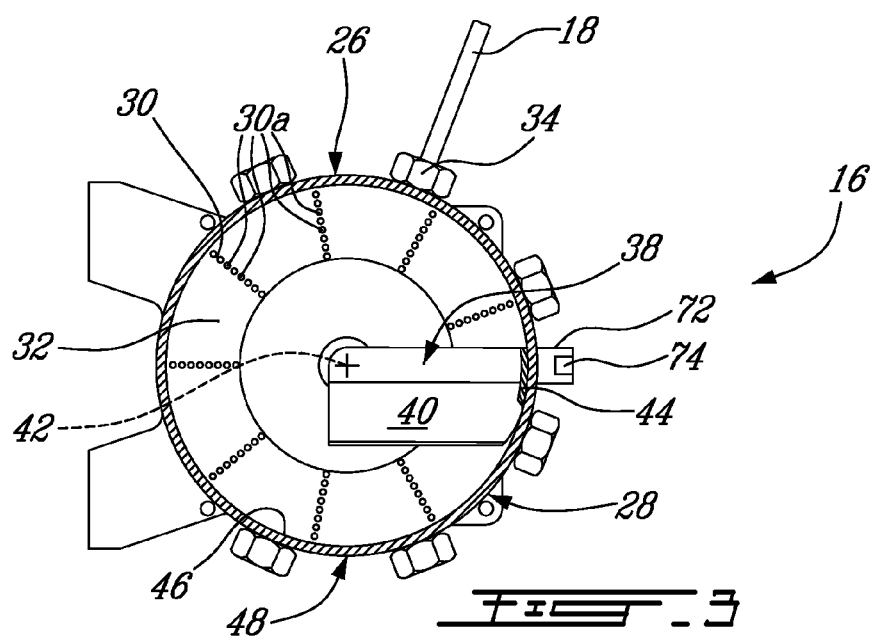

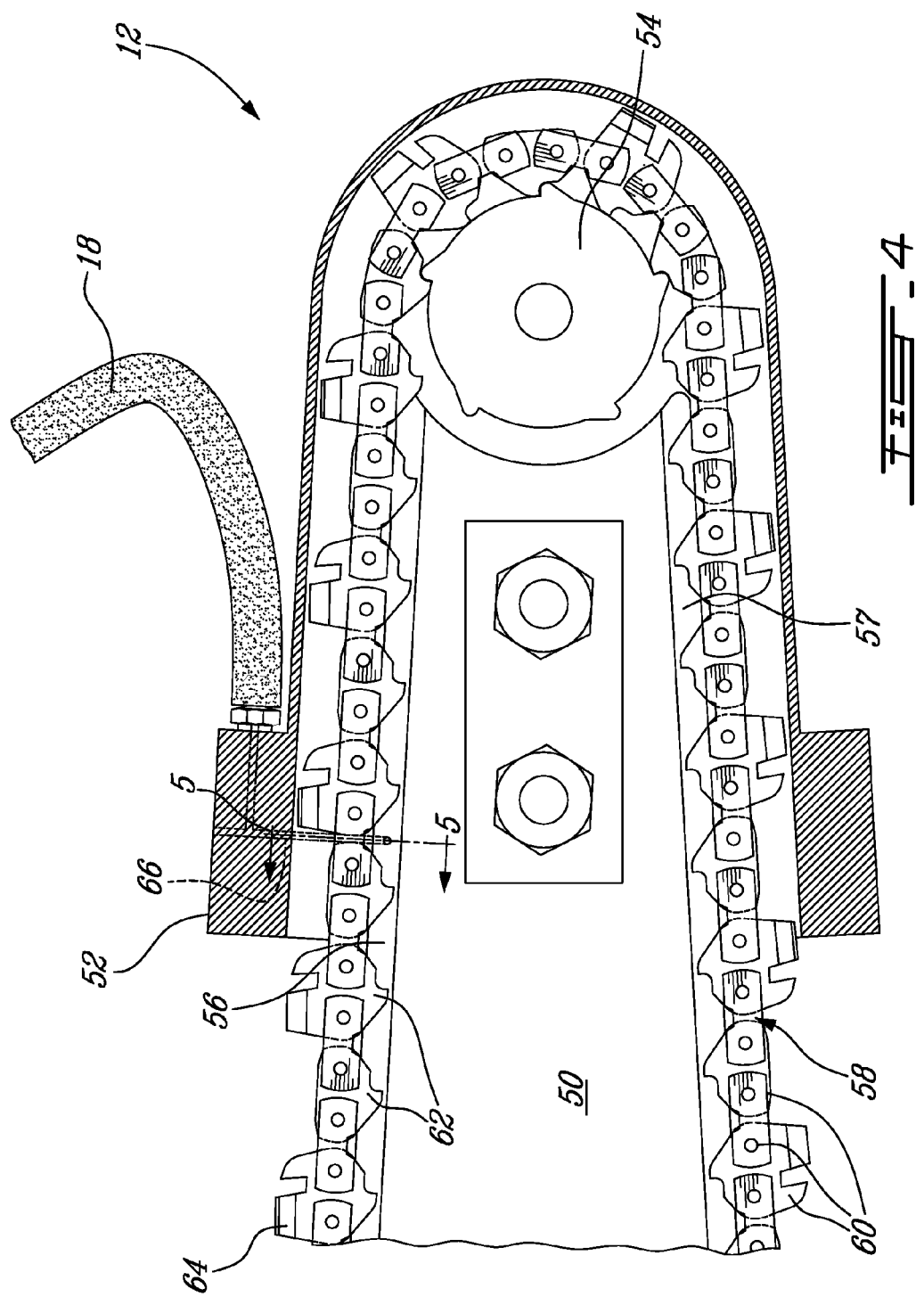

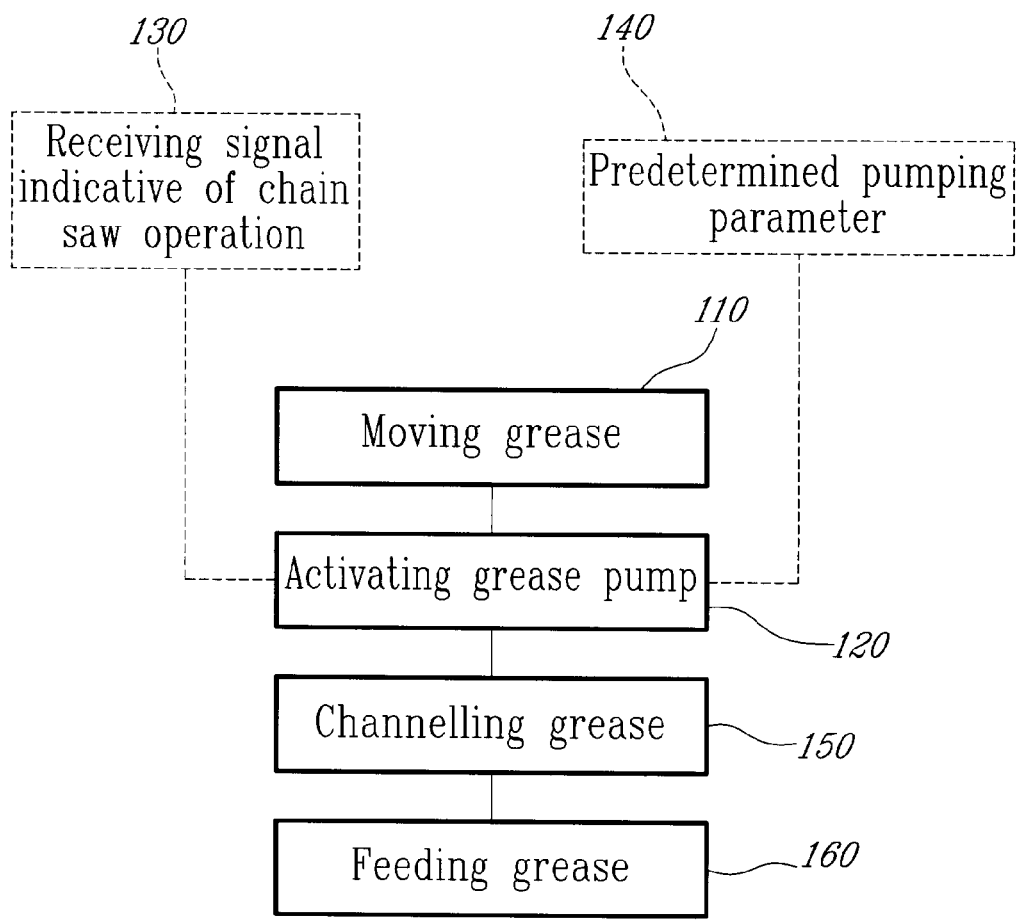

SYSTEM AND METHOD FOR LUBRICATING A CHAIN SAW WITH GREASE

This application is a 371 application of PCT/CA2007/000884 filed May 17, 2007.

BACKGROUND

Chain saws are typically provided with a guide bar which has a longitudinal slit defined along its edge, and have an endless chain engaged with the longitudinal slit of the guide bar. The endless chain is driven by a driving sprocket provided at one end of the guide bar. The chain is usually comprised of a plurality of chain links which include outwardly oriented sawing teeth, and inwardly oriented guiding projections, or tabs. The tabs engage the slit, and can also be in mesh with the driving sprocket for driving the chain. Sliding of the tabs within the slit and engagement thereof with the sprocket results in friction.

To reduce the friction between the endless chain and the guide bar, chain saws of forestry equipment are typically provided with at least one oil conduit through the body of the guide bar and having an outlet located in the slit. Oil is fed through the oil conduit, and is received by the guiding tabs of the chain. The guiding tabs of the chain spread the oil along the slit as they travel therein.

Although such methods of lubricating chain saws with oil have been used for decades, and have been satisfactory to a certain degree, they are met with several drawbacks. For instance, the speed at which chain saws of forestry equipment such as tree fellers or saw mills are operated generates a relatively high level of centrifugal force which drives the oil to be evacuated outwardly from the chain links. As a result, a relatively high volume of oil is typically consumed. For instance, a tree feller can consume close to 2 500 liters of chain saw oil per year.

In addition to cost considerations, disposing of the oil can have environmental consequences. In the case of tree fellers, the oil is typically released onto the forest ground.

There is therefore a need to reduce the amount of lubricant consumed by chain saws of forestry equipment. There is also a need that chain saw lubrication be done in a more environmentally-friendly manner.

SUMMARY

In accordance with one aspect, there is provided a system for lubricating a chain saw with grease, the system comprising a grease pump having a pump inlet and a pump outlet, a grease reservoir communicating with the pump inlet, a grease feeder in the grease reservoir, the grease feeder being configured and adapted to move grease from the grease reservoir to the pump, through the pump inlet; the chain saw having a guide bar with a slit defined in an edge thereof, and an endless chain slidingly engaged in the slit, the guide bar further having a lubricant conduit defined therethrough, the lubricant conduit having a conduit inlet connected to the pump outlet, and a conduit outlet located in the slit.

In accordance with an other aspect, there is provided a method of lubricating a chain saw with grease, the method comprising:
  moving the grease contained in a grease reservoir toward a grease pump,
  activating the grease pump to pump grease from the grease reservoir through a pump outlet,
  channelling the grease from the pump outlet to the chain saw, and
  feeding the channelled grease between an endless chain and a guide bar of the chain saw.

In accordance with an other aspect, there is provided a system for lubricating a chain saw with grease, the system comprising a grease pump having a pump inlet and a pump outlet, a grease reservoir communicating with the pump inlet, means for moving grease from the grease reservoir to the pump, and means for channelling grease from the pump outlet to an endless chain of the chain saw.

DESCRIPTION OF THE FIGURES

In the appended figures, enclosed for the purpose of demonstration:

FIG. 1 is a schematic view of an example of a system for lubricating a chain saw with grease, in which the system is applied to a tree feller;

FIG. 2 is a side view, enlarged, of the grease pump assembly used in the system of FIG. 1;

FIG. 3 is a cross-sectional view taken along lines 3-3 of FIG. 2;

FIG. 4 is a cross-sectional view taken along lines 4-4 of FIG. 1, showing a portion of the chain saw used in the system of FIG. 1;

FIG. 6 is a flow chart showing an example of a method for lubricating a chain saw with grease.

DETAILED DESCRIPTION

Figure 5:
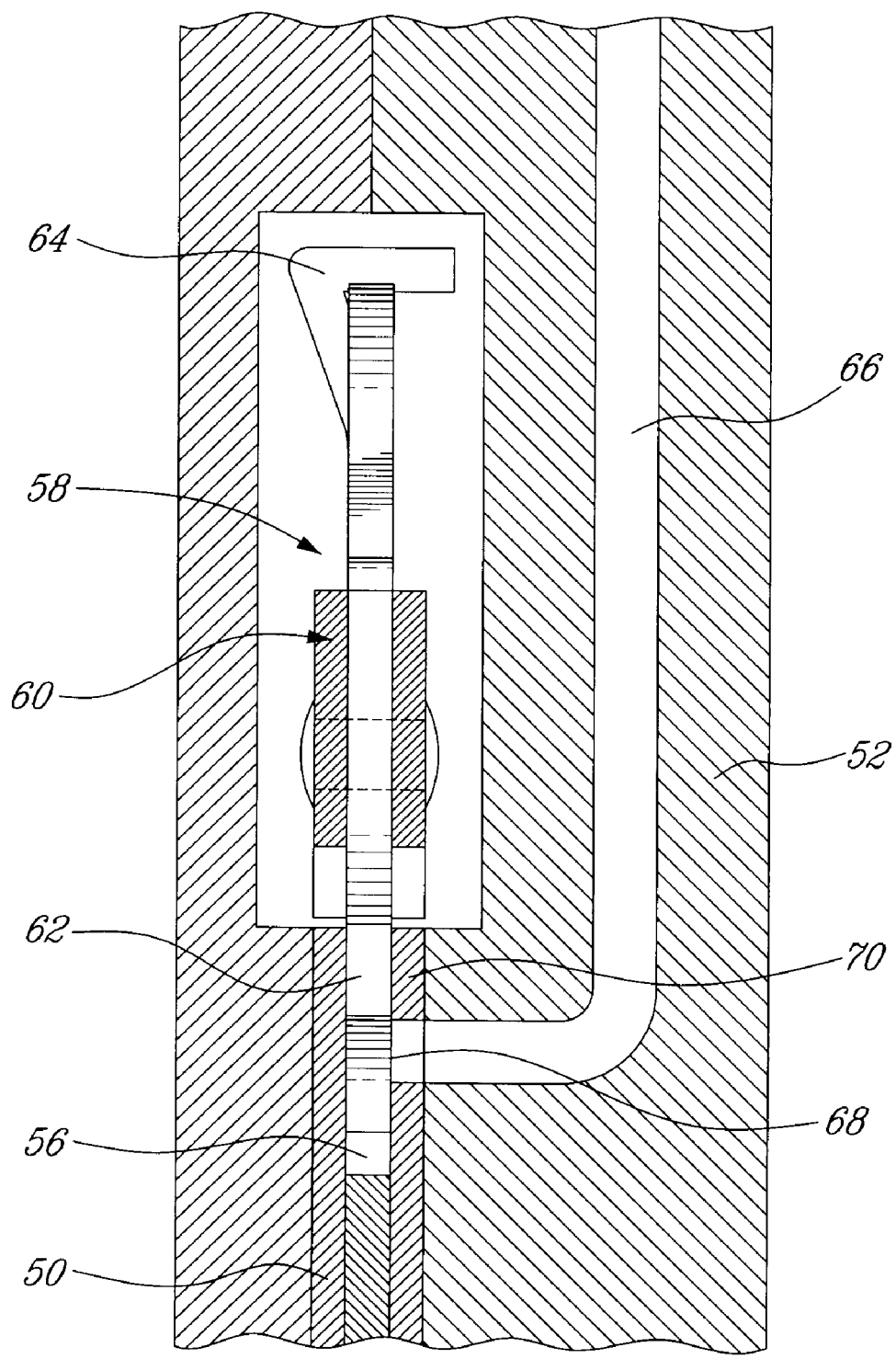
FIG. 5 is a cross-sectional view taken along lines 5-5 of FIG. 4.

FIG. 1 shows an example of a system 10 for lubricating a chain saw 12 with grease 14. The system 10 includes a grease pump assembly 16, and a hose 18 connecting the grease pump assembly 16 to the chain saw 12. In this example, the system 10 is mounted on a tree feller 20. In particular, the grease pump assembly 16 is mounted to a body 22, or cabin, of the tree feller 20, and the hose 18 runs along an articulated operating arm 24 thereof, leading to the chain saw 12, which is provided at a far end of the operating arm 24.

FIGS. 2 and 3 show the grease pump assembly 16 in greater detail. In this example, the grease pump assembly 16 is the model AG-10, from the company Allfett. The grease pump assembly 16 includes a grease reservoir 26 positioned atop a grease pump 28. The grease pump 28 has an inlet 30 in the form of a plurality of inlet apertures 30a defined in the bottom wall 32 of the grease reservoir 26. In this model, the grease pump 28 has a plurality of outlets, however, only one outlet 34 is used in this case, to which the grease hose 18 is connected. The grease hose 36 can advantageously be a hydraulic-grade hose to support the pressure generated when pumping the grease. For indicative purposes, the pumping pressure can be of the order of 600 bar.

To move the grease toward and through the inlet apertures 30a, an L-shaped grease scraper 38 is used inside the grease reservoir 26. The grease scraper 38 has a lower, horizontal portion 40, an inner end of which is connected to a rotary shaft (not shown) of the grease pump assembly 16, for rotation thereof about a vertical rotation axis 42. The grease scraper 38 also has an outer, vertical portion 44, extending upwardly from the outer end of the horizontal portion 40.

In use, the grease scraper 38 is rotated around the rotation axis 42, and the vertical portion 44 slides along the circular inner surface 46 of the side wall 48 of the grease reservoir 26, thus helping the grease which could tend to adhere to the side wall 48 to move towards the lower portion of the grease reservoir 26 under the effect of gravity. The horizontal portion 40 of the grease scraper 38 smudges the grease through the inlet apertures 30a during rotation. The overall effect of the grease scraper 38 is thus to move the grease from the grease reservoir to the pump 28, through the pump inlet 30.

The internal components (not shown) of the pump 28 then push the grease out the pump outlet 34, and into the hose 18, by applying pressure.

As grease is pumped from the grease reservoir 26 into the hose 34, the grease already in the hose 18 progressively travels therealong, toward the chain saw 12 (FIG. 1).

FIG. 4 shows how the hose 34 is connected to the chain saw 12 in this example. The chain saw 12 has a blade, or guide bar 50, fixedly mounted to a base 52. A driving sprocket 54 is mounted in the base 52, at one end of the guide bar 50. Guiding slits 56, 57 are defined along both edges of the guide bar 50. An endless chain 58 is engaged with the guiding slits 56 and the driving sprocket 54. The endless chain 58 has a plurality of chain links 60, some including inwardly-oriented guiding tabs 62 and some including outwardly-oriented sawing teeth 64. In use, the guiding tabs 62 engage the slit and slide therewithin as the driving sprocket 54 drives the endless chain 58. In this case, the guiding tabs 62 are also configured to be in mesh with the driving sprocket 54 for driving the chain.

In the illustrated embodiment, an oil-lubricated chain saw 12 is converted to grease lubrication by connecting the grease hose 18 to an existing oil-lubrication conduit 66 provided through the base 52 and through the guide bar 50 of the chain saw. This is depicted more clearly in FIG. 5.

The conduit 66 has an outlet 68 in the slit 56 of the guide bar 50. In this case, the outlet 68 is defined through one of the sides 70 of the slit 56, and is advantageously positioned for communication with the guiding tabs 62 when the guiding tabs 62 are moved across the outlet 68, as the endless chain 58 is activated.

Experiments using a GB 11 LM model chain saw from the company GB have shown that the size of the existing oil-lubrication conduit can be sufficient for pumping a satisfactory amount of grease therethrough, using the AG-10 pump assembly.

It was also found that the length of the hose 18 used to connect the pump assembly 16 to the chain saw 12 did not have much impact on the pumping pressure achieved at the outlet 68 of the conduit 66.

In comparison with oil—a viscous fluid—grease is often referred to as a plastic fluid. Grease does not behave in the same manner as oil does. In particular, greases typically have a greater tendency to adhere to surfaces and to resist centrifugal forces applied to them than oils do. This can advantageously diminish the lubricant consumption in chain saw lubrication applications because the grease has a tendency to stay on the chain 58 longer than oil, and to better resist the high speed and centrifugal forces on the endless chain 58. For illustrative purposes, the RPM of the chain saw 12 can be in the order of 9000 during operation.

However, because it is not really liquid, grease generally does not flow to the bottom of a reservoir by itself. For this reason, a grease feeder should be used in the grease reservoir 26 to move the grease toward the grease pump 28. In the example given above, the grease feeder is a grease scraper 38. However, it is to be understood that equivalents thereof can be used, such as a piston which presses the grease in the grease reservoir toward the grease pump, for example, or any other suitable grease feeder.

The exact choice of a grease pump, grease reservoir, and grease feeder in view of specific alternate embodiments are left entirely to those skilled in the art. In the example given above, the AG-10 model grease pump assembly 16 was used because it is suitable to the application depicted. Other types of assemblies can alternately be used. In certain applications, the pump, reservoir, and feeder can be provided in the form of separate components instead of an assembly.

In a tree feller 20, the chain saw 12 typically has an operating circuit with a user interface (e.g. a press button) in the operator cabin 22. To activate the chain saw 12, the operator interacts with the user interface. Because of the behaviour of oil, systems for lubricating chain saws with oil typically include an oil pump which is connected to the user interface. When the chain saw is activated, the oil pump is automatically activated, and remains activated for as long as the chain saw remains activated (e.g. as long as the button is pressed). Oil is thus continuously fed to the chain saw during activation.

When using grease as the lubricant, it can be advantageous to use a pump activator 72 (FIG. 2) connected to the chain saw operating circuit in a manner to detect when the chain saw 12 is activated. The pump activator 72 can advantageously be connected with a timer 74 which controls a predetermined period of time. Upon receiving the signal indicating activation of the chain saw 12, the pump activator 72 can advantageously be configured to control the grease pump 28 to pump grease during the predetermined amount of time, and then stop, even if the chain saw 12 continues its activation. In fact, because grease can stay on the endless chain 58 for a longer period of time than oil, it can avoid the requirement of continuous pumping. A specific amount of grease to be applied for each chain saw activation period (such as an average period for cutting a log, for example) can be determined, and the specific amount of grease be controlled by the predetermined amount of time set in the timer 74. It can be advantageous in certain applications to use an adjustable timer, to allow the user to adjust the amount of grease applied to adapt to certain varying conditions, such as outside temperature, type of wood, etc.

For comparison purposes, grease pumps used in central lubrication systems of forestry machinery are typically activated in a periodic manner, at each 10, 15, or 20 minutes. In the illustrated example, the electronic card programmed for periodic activation of the pump, which is provided with the AG-10 pump assembly when purchased, was removed and replaced by the pump activator 72 and timer 74.

In alternate embodiments, other predetermined pumping parameters than a predetermined period of time or a predetermined amount of grease can be used to influence the pumping action of the pump, such as outside temperature control for instance. In alternate embodiments, the grease pump can also be connected in a manner to remain in activation as long as the chain saw remains activated.

The system for lubricating a chain saw with grease can be used in other applications than on a tree feller 20. It can be used in many other machinery vehicles which have a chain saw, and can also be used in bench operations. For example, the chain saw can alternately be connected to a frame which is bolted to a floor in a wood factory, in which case the grease pump assembly can be mounted to the frame or to the ground. It will therefore be understood that the system can be used with many different types and models of chain saws, and can advantageously be connected, or retro-fitted, to pre-existing oil-lubricating conduits provided on such chain saws. Some chain saws have oil-lubricating conduits with two or more outlets in the slit. In many cases, it is advantageous that the chain saw be connected to an other structure, such as a vehicle, or frame, to allow mounting the grease pump assembly to that other structure or to the ground.

FIG. 6 shows the steps for lubricating a chain saw with grease. Grease is moved 110 toward the grease pump in the grease reservoir. The grease pump is activated 120 to pump grease from the grease reservoir through a pump outlet. Optionally, this is done upon receiving 130 a signal indicative of activation of the chain saw. Optionally, the grease pump activation is controlled 140 according to at least one predetermined pumping parameter, such as a predetermined period of time. Pumped grease is channelled 150 from the pump outlet to the chain saw. Channelled grease is fed 160 between the endless chain and the guide bar.

It will be understood by those of skill in the art of lubrication that many different types of greases can advantageously be used with the instant system and/or method. The following discussion is intended to assist persons desiring to elect or prepare a suitable grease composition.

Greases typically include base oil and a thickener, and can also include one or more additives. The proportion of base oil in grease is generally above 85%, and additives generally account for 3% or less, the remaining percentage corresponding to that of the thickener.

Some factors which are of pertinence in selecting an appropriate type of grease include the viscosity of the base oil, the type of thickener used, adhesiveness, the amount of thickener used in the grease, and the type of base oil used.

The viscosity of the base oil typically affects the lubrication capacity, the operating temperature range, and the pumping ability of the grease. The thickener type typically impacts on the resistance to water washout from rain, snow, etc., and can also impact the pumping ability of the grease. Adhesiveness can be enhanced by additives, such as by adding polymers, however too much adhesiveness can impact other characteristics. The amount of thickener used in the grease impacts the consistency of the grease. If the grease is too stiff (too much thickener), it can affect the pumping ability, and render the grease difficult to pump through the system. If the grease is too fluid (not enough thickener), it will generally have less resistance to the centrifugal forces affecting the endless chain. Also, the type of base oil used has an influence on the adhesiveness to metal components of the chain saw guiding slit or endless chain, and have an influence on environmental effects or consequences. For instance, some vegetable oils are known to exhibit bipolar behaviour, and can have an enhanced adhesiveness to metal surfaces as compared to mineral oils. Further, vegetable oils are biodegradable, which can contribute to reduce the environmental impacts of chain saw lubrication.

The system can advantageously allow to reduce the amount of lubricant consumed by using greases having either a vegetable base oil or a mineral base oil, because greases will typically stay on the chain longer than oil. Reducing the amount of lubricant required generates cost incentives due to the economy in lubricant, but can also have environmental advantages because the amount of oil released into the environment, or having to be treated, can be reduced, and the amount of containers used to handle the oil is also reduced.

Two types of mineral-oil based greases have been tested with the above described example and offer satisfactory lubrication characteristics: the Chevron Delo™ EP 0 and EP 1 greases which are based of hydro treated mineral oil and use a lithium complex as the thickener, and the Chevron Black Pearl™ EP 0 and EP 1 greases which also use hydro treated mineral oil but with a polyurea complex thickener. It will be appreciated that many other formulations using mineral oils can also offer satisfactory chain saw lubrication characteristics.

Even further benefits and advantages can be achieved by using a grease which is biodegradable instead of the greases suggested above. In the present specification, a "biodegradable" grease is intended to mean a grease which has a degradation rate of at least 50%, and preferably over 70% when tested with the OCDE 301D test, or a degradation rate of at least 60%, and preferably over 80% when tested with the CEC L-33-A-93 test. For indicative purposes, the degradation rate of mineral-oil based greases is typically of the order of 10 to 15% with the OCDE 301D test and of the order of 20 to 30% with the CEC L-33-A-93 test. Also for indicative purposes, the degradation rate of canola oil is of about 85% with the OCDE 301D test and of about 97% with the CEC L-33-A-93 test.

For indicative purposes, biodegradable greases can be achieved by using vegetable oils such as soya, canola, or flax oil, for example, instead of mineral oil. Though other thickeners can be used, using a clay-based thickener can be advantageous. Additives can be added to adapt the formulation to the requirements of specific applications. Tests have shown that formulations containing about 90% canola oil and about 10% clay generally yield satisfactory characteristics.

In some applications, mineral-based oils can be mixed in with a higher percentage of vegetable oil, however, this is generally detrimental to the degradation rate.

As can be seen therefore, the examples described above and illustrated are intended to be exemplary only. The scope of the patent is intended to be determined solely by the appended claims.

What is claimed is:

1. A system for lubricating a chain saw with grease, the system comprising a grease pump having a pump inlet and a pump outlet, a grease reservoir receiving the grease and communicating with the pump inlet, and a pump activator adapted to receive a signal indicative of activation of the chain saw, to activate the grease pump upon receiving the signal and to control the grease pump according to at least one predetermined pumping parameter, wherein the at least one predetermined pumping parameter includes at least one of a predetermined period of time during which grease is injected and a predetermined amount of injected grease; the chain saw having a guide bar with a slit defined in an edge thereof, and an endless chain slidingly engaged in the slit, the guide bar further having a lubricant conduit defined therethrough, the lubricant conduit having a conduit inlet connected to the pump outlet, and a conduit outlet located in the slit through which grease is injected in the slit.

2. The system of claim 1, wherein the at least one predetermined pumping parameter includes the predetermined period of time during which grease is injected.

3. The system of claim 2, further comprising a timer operatively connected to the pump activator and controlling the predetermined period of time during which grease is injected following activation of the chain saw.

4. The system of claim 3, further comprising a timer interface for said timer, for inputting the predetermined period of time.

5. The system of claim 1 wherein the reservoir has an inner wall surface of circular cross-section and an apertured flat bottom surface, a grease feeder in the reservoir, the grease feeder being configured and adapted to move grease from the reservoir to the pump, through the pump inlet, and the grease feeder includes a rotatable grease scraper mounted co-axially in the grease reservoir to cooperate with the inner surface and bottom surface when rotatably activated to move the grease.

6. The system of claim 1 further comprising a hydraulic hose connecting the pump outlet to the conduit inlet.

7. The system of claim 1 wherein the chain saw is connected to an other structure.

8. The system of claim 7 wherein the other structure is a vehicular machine.

9. The system of claim 7 wherein the other structure is a frame secured to the ground.

10. A method of lubricating a chain saw with grease, the method comprising: immediately activating a grease pump to pump grease from a grease reservoir through a pump outlet upon receiving a signal indicative of activation of the chain saw and controlling the activated pump in accordance with at least one pumping parameter including at least one of a predetermined amount of time and a predetermined amount of injected grease, channelling the grease from the pump outlet to the chain saw, and feeding the channelled grease between an endless chain and a guide bar of the chain saw immediately following activation of the chain saw.

11. The method of claim 10 wherein the at least one predetermined pumping parameter comprises the predetermined amount of time.

12. The method of claim 10 wherein the feeding includes outputting the grease in an endless chain guiding slit of the guide bar.

13. The method of claim 10 further comprising moving the grease contained in the grease reservoir toward the grease pump by rotating a scraper against an inner surface of the grease reservoir.

14. A system for lubricating a chain saw with grease, the system comprising a pump having a pump inlet and a pump outlet, a reservoir receiving the grease and communicating with the pump inlet, means for channelling grease from the pump outlet to an endless chain of the chain saw, and a pump activator adapted to receive a signal indicative of activation of the chain saw and to immediately activate the pump upon receiving the signal and to control the pump to pump grease according to at least one predetermined pumping parameter, wherein the at least one predetermined pumping parameter includes a predetermined period of time during which grease is injected.

15. The system of claim 14 further comprising a timer, wherein the predetermined period of time is controlled by the timer.

16. The system of claim 14 further comprising means for moving grease from the reservoir to the pump.

* * * * *